May 5, 1970 R. L. BROWN ET AL 3,510,737

SERVOMECHANISM INCLUDING PARALLELED "LEAD-LAG" CHANNELS AND MEANS TO DISABLE LAG CHANNEL RESPONSIVE TO EXCESSIVE RATE

Filed Dec. 21, 1964 6 Sheets-Sheet 1

INVENTORS.
ROBERT L. BROWN
RONALD C. TRUMP

BY Gordon Reed

ATTORNEY

INVENTORS.
ROBERT L. BROWN
RONALD C. TRUMP
BY
Gordon Reed
ATTORNEY

INVENTORS
ROBERT L. BROWN
RONALD C. TRUMP
BY Gordon Reed
ATTORNEY

INVENTORS
ROBERT L. BROWN
RONALD C. TRUMP
BY Gordon Reed
ATTORNEY

INVENTORS
ROBERT L. BROWN
RONALD C. TRUMP
BY
Gordon Reed
ATTORNEY

-----INDICATE RESULT OF SWITCHING

INVENTORS
ROBERT L. BROWN
RONALD C. TRUMP

BY Gordon Reed

ATTORNEY

United States Patent Office 3,510,737

Patented May 5, 1970

3,510,737

SERVOMECHANISM INCLUDING PARALLELED "LEAD-LAG" CHANNELS AND MEANS TO DISABLE LAG CHANNEL RESPONSIVE TO EXCESSIVE RATE

Robert L. Brown, Largo, and Ronald C. Trump, St. Petersburg, Fla., assignors to Honeywell Inc., Minneapolis, Minn., a corporation of Delaware Filed Dec. 21, 1964, Ser. No. 419,907
Int. Cl. G05b *5/01*
U.S. Cl. 318—18 5 Claims

ABSTRACT OF THE DISCLOSURE

A closed loop servo system applies a control signal to two parallel channels, one channel is responsive to the rate of change of the signal and the second applies a lag effect to the applied signal. The outputs of the two channels are summed and applied to a power amplifier that drives the servo.

The lag channel includes a capacitor or signal storage device which at low frequency for the input signal becomes full charged. The rate channel capacitor output does not contain sufficient energy to discharge the capacitor in the lag channel. The output therefore returns to the polarity appearing on the capacitor before the rate occurred in the rate channel. For a period of time after the rate signal occurs, the output remains in phase with the input until the capacitor charges in the opposite direction. In the closed loop servo system, this represents a positive feedback resulting in an oscillatory condition. Such oscillatory condition is avoided by discharging the capacitor in the lag channel when the rate of change of the signal passing into the rate channel has a high magnitude as when the signal changes phase.

This invention pertains to control apparatus or servomechanisms of the closed loop-type wherein an operation is initiated and continues until the loop is balanced. An example of the closed loop system is the gimbal control loop for the single axis platform. The single axis platform includes a gyroscope rotor having one axis of freedom in addition to its spin axis. The former is called the output axis which is mounted on a frame supported on a rotatable platform coupled to a servomotor. For example if the platform be installed in an aircraft with the platform axis aligned with the Z axis of the aircraft, the output axis of the gyro will be at right angles to this axis. If a gust suddenly changes the aircraft's heading say in a counter clockwise direction, as soon as the aircraft starts the change in heading the gyro will instantly sense the angular change and the rotor will precess to an angle about its gimbal or output axis proportional to heading change. Such displacement of the gyro rotor about the gimbal or output axis will cause the gyro pickoff such as a resolver or signal generator associated with the output axis to generate a control signal which controls the servomotor for the stabilized platform. The motor proceeds to drive the platform in a direction opposite to the plane's change in heading. This platform rotation will cause the gyro rotor to precess in the opposite direction about the gimbal axis. When the gyro spin axis has been precessed back to its original neutral position, the platform will have been rotated back through an angle in accordance with the change in heading or original deflection caused by the gust. The control signal from the pickoff or signal generator will drop to zero, the motor will stop rotation, and the gyro and platform will again be oriented in their original azimuth position.

The accuracy and stability requirements imposed on such closed loop systems are becoming increasingly stringent with the advancement and improvements in guidance systems. In these precise closed loop systems a requirement is often made that an output shall follow an input to within a small allowable error. In many instances the control signal applied to the closed loop system may be of large magnitude that would occur at high frequency whereas in other instances the control signal may be of small magnitude as at low frequency.

An object, therefore, of this invention is to provide an improved feedback controller for a closed servo loop having high controller gain at higher frequencies and lag-lead compensation networks to ensure stability in the linear range of operation.

A further object of this invention is to provide an improved controller for a closed loop servo with provisions for speeding up rebalancing operation of the loop and providing lag compensation and control input data smoothing.

A further object of this invention is to provide an improved controller for a closed servo loop with provisions for speeding operation of the loop and providing lag compensation and input data smoothing wherein means are effective on high rates of change of input signals for disabling the lag effect to obtain static loop compensation to avoid a system oscillatory condition.

A further object of the invention is to provide a controller for a servomechanism that effects operation of the servo in the nonlinear region and still provides stability and accuracy in the null or balance region.

A further object of the invention is to provide a controller for a servomechanism that effects nonlinear operation of the servomechanism under one condition of its control signal and linear operation under a second condition of its control signal.

Still further objects of the invention will become apparent from the following description taken in connection with the accompanying drawings, in which:

FIG. 8 is a single axis gimbal controlled transient response for a large signal, with the transistor switch on;

According to the invention which has been embodied in electrical form, an AC signal as in the pick-off or resolver of a single axis gyro which signal includes a suppressed carrier, 400 c.p.s., is amplified in a pre-amplifier, The signal carrier is removed in a demodulator circuit and split into two parallel channels, a DC or proportional channel and an AC or rate channel. The DC channel consists of a lag amplifier where low frequency compensation is achieved and this output feeds one input of a high quality summing-power amplifier. The AC or dynamic channel is fed through an active rate compensation network (a rate amplifier) to the input of the summing-power amplifier. In this manner, each signal may be operated upon independently in the channels to provide static loop compensation, and each is limited to any desired level from transient response considerations. These signals from the lag and rate amplifier are recombined in the summing amplifier and then power boosted in a power stage for driving the platform servomotor resulting in opposite precession of the single axis gyroscope and nulling of the signal generator.

A transistor switch, importantly, is utilized in the servo loop where low frequency lag time constants are required for static loop compensation. The switch is used to disable the lag effect in the DC channel during periods of large rates of change of the control signal to the rate amplifier as at the breakdown voltage of the Zener diodes in the limiting arrangement for the rate amplifier. This greatly improves the loop transient response without decreasing gain and prevents an oscillatory or overshoot condition from developing in the loop at turn on. The switch is actuated by the rate amplifier, and operates on either plus or minus signal polarities. Thus whenever a control signal rate is sufficient in magnitude to cause the rate amplifier to limit, the transistor switch is actuated and performs two functions: (a) the input of the lag amplifier is clamped to ground, and (b) any charge existing on the large capacitor (being mechanized by the lag amplifier) is discharged. This condition exists for the period of the time that the rate amplifier remains in limiting. Thus when signal rate conditions reach or exceed a predetermined level in the loop, the AC or dynamic channel always overpowers the DC channel and resets the lag capacitance, or time constants, to approximately zero.

Figure 1:
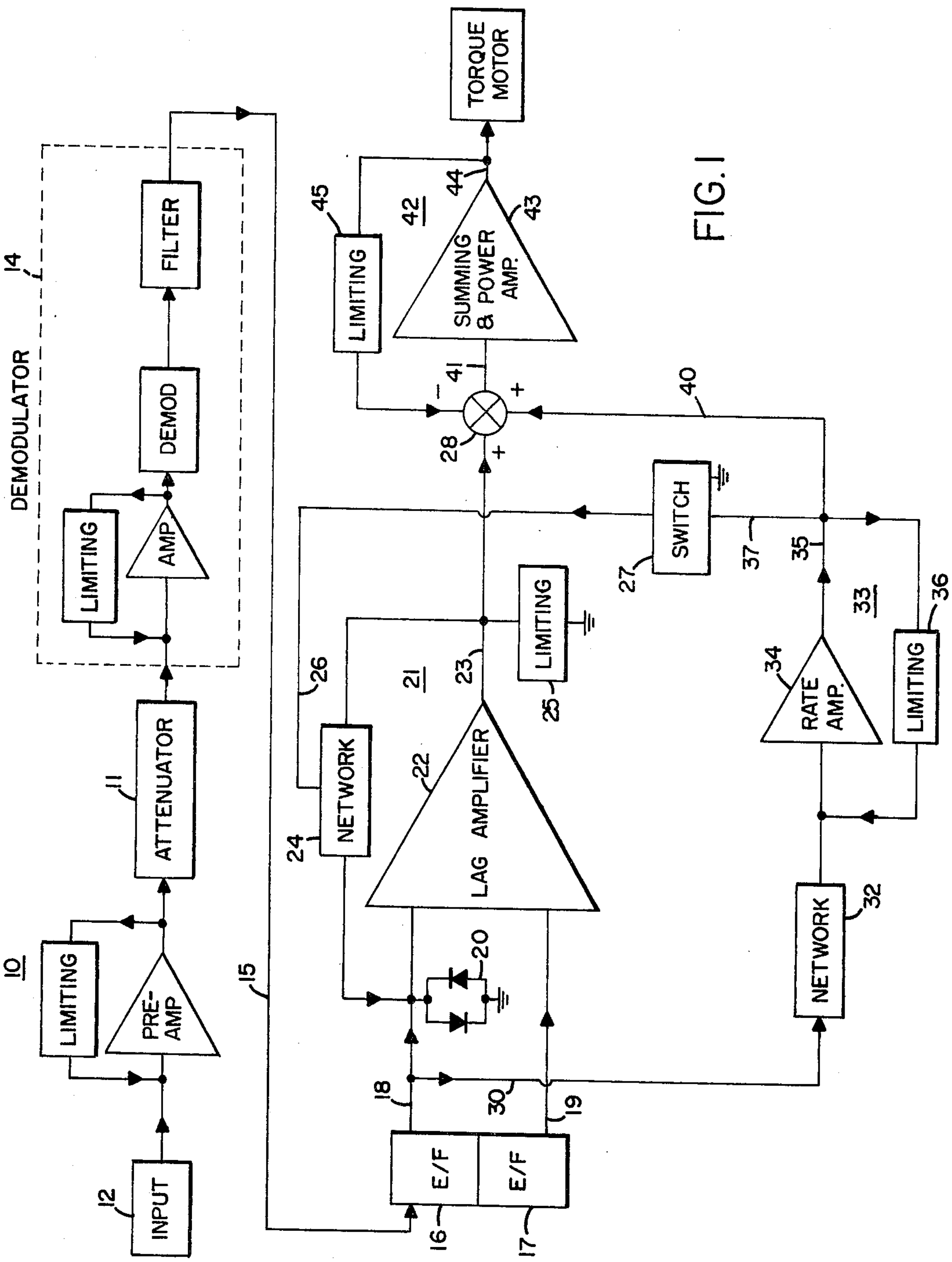
FIG. 1 is a block diagram of the single axis platform stabilization loop with the novel feedback controller.

In FIG. 1, a preamplifier 10 receives an AC input signal from the signal generator or resolver 12 of the gyroscope due to its precession about its sensitive axis. The output of the preamplifier 10 is applied to attenuator 11 and the signal path continues through the demodulator 14, conductor 15, to balanced emitter followers 16, 17. From the output side of the balanced emitter followers 16, 17, conductors 18, 19, extend to a lag amplifier 22 of a low frequency compensation path 21. The output of amplifier 22 is supplied by conductor 23 to a summing device 28. Summing device 28 receives a second input from an active rate compensation network 33 in parallel with network 21. Thus the control signal on conductor 18 by means of subconductor 30 is also supplied through lead network 32 to amplifier 34 of rate compensation network 33. The output of amplifier 34 is further supplied by conductor 40 to signal summer 28. The two signals from networks 21 and 33 are of like sign and their sum is supplied by conductor 41 to summing and power amplifier 43. The output of amplifier 43 is supplied in feedback relation through limiting device 45 to the summing device 28 in opposition to the two input signals. The output of amplifier 43 is also supplied to the servomotor 46 which drives the single axis platform whereby precession thereof occurs in opposite sense reducing the input signal of the resolver 12 connected in the servo loop arrangement to zero.

The output of amplifier 22 is supplied in a feedback relation through network 24 to the input side of amplifier 22. The conductor 18 on the input side of amplifier 22 is connected to signal ground through a diode arrangement 20. Network 24 which is to be controlled is connected through conductor 26 to a transistorized switch 27.

The output of lead amplifier 34 is supplied by conductor 35 in feedback relation through limiting device 36 to the input side of amplifier 34. The output on conductor 35 is also supplied by subconductor 37 to transistorized switch 27 for control thereof.

Figure 5:
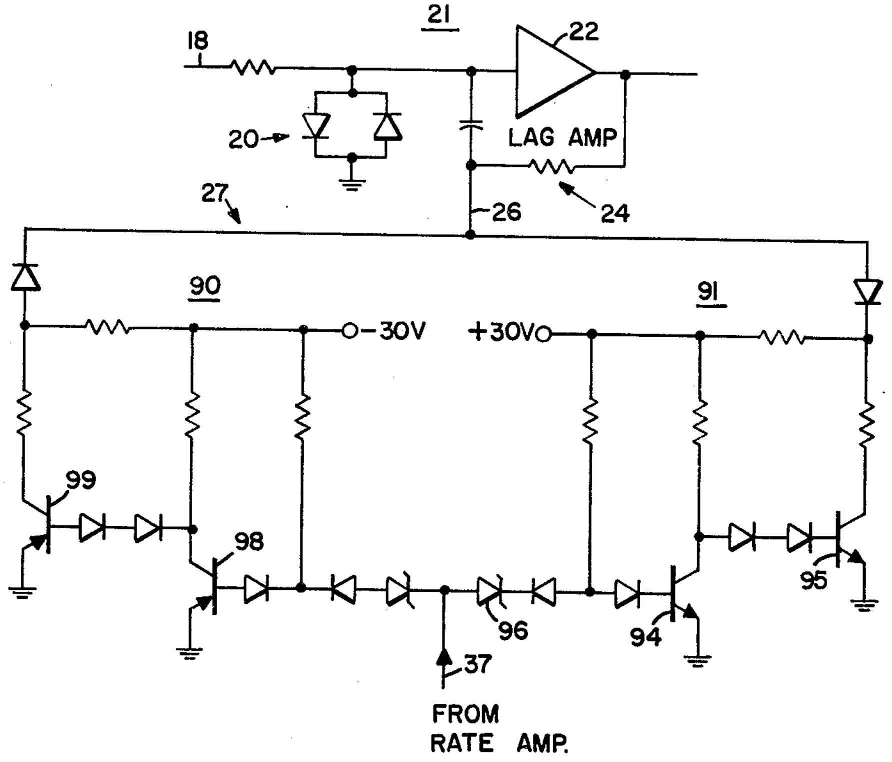
FIG. 5 is an electrical schematic of a transistorized switch of FIG. 1.
Figure 3:
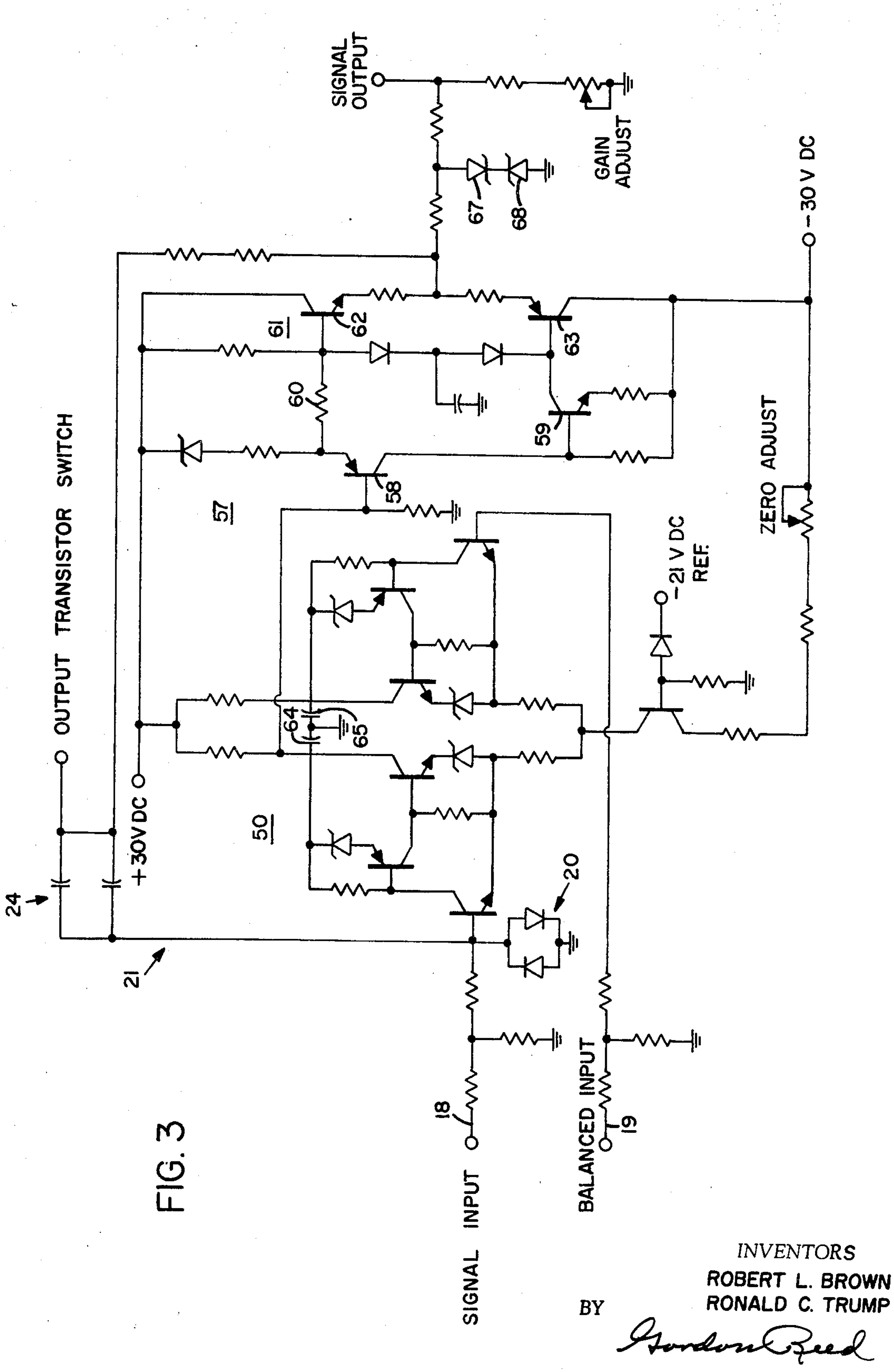
FIG. 3 is an electrical schematic of the lag amplifier in FIG. 2.
Figure 4:
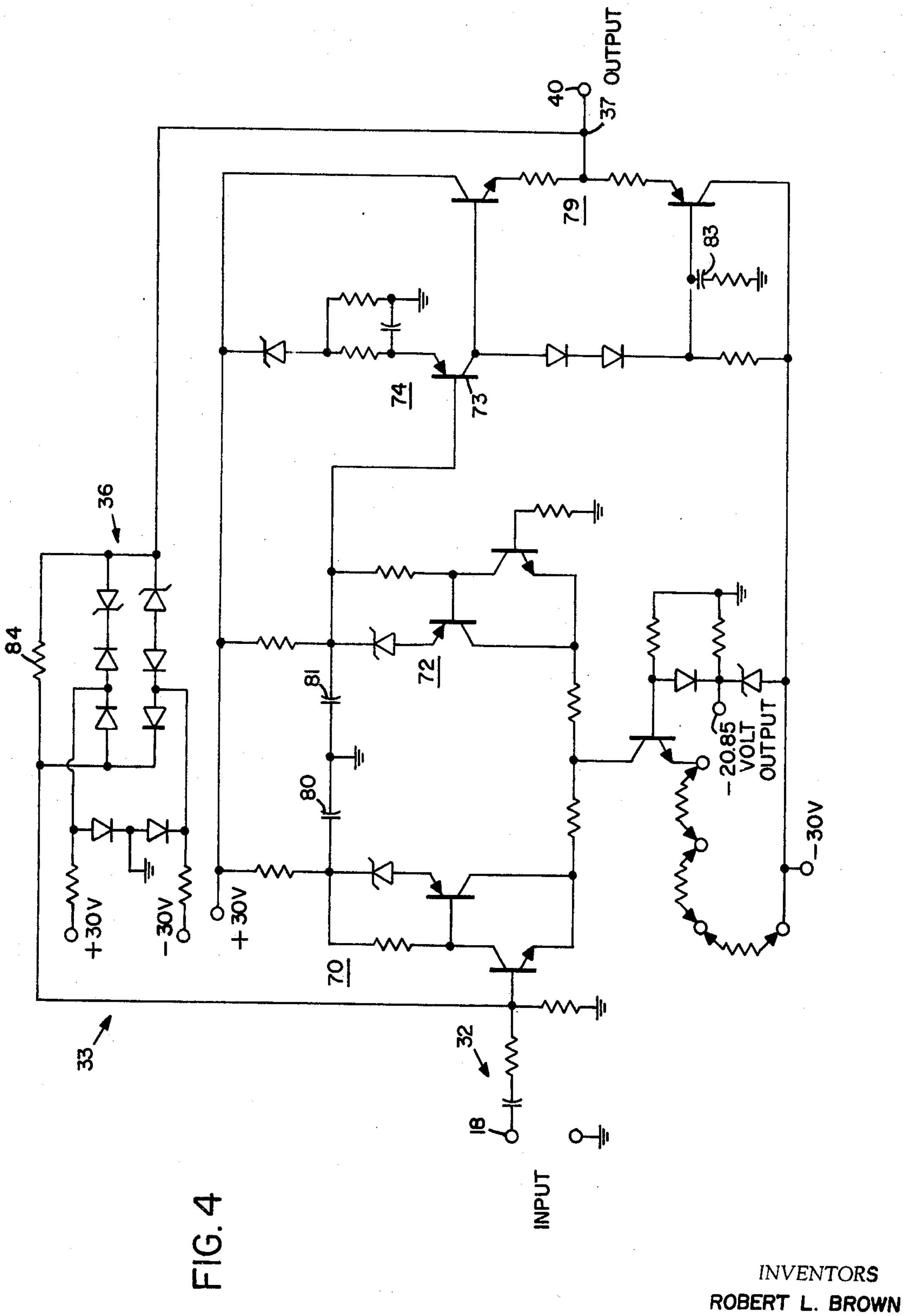
FIG. 4 is an electrical schematic of a rate amplifier in FIG. 2.

The functional relationship of details of networks 21, 33, and transistor switch 27 will be considered in FIGS. 3, 4, and 5.

Figure 2:
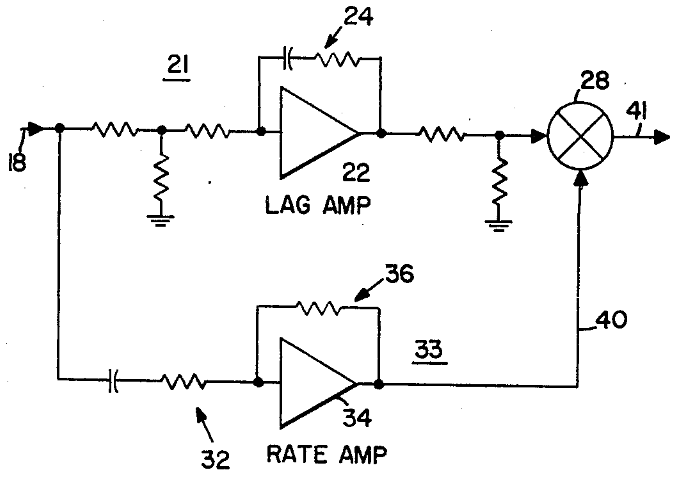
FIG. 2 is an electrical schematic of a portion of the closed loop circuit.

In FIG. 2, the lag amplifier means 21 and the rate amplifier means 33 are connected in parallel between the input conductor 18 which carries the output of the balanced emitter followers and the summing device 28. The DC or proportional channel 21 consists of the lag amplifier 22 having a feedback circuit 24 comprising a resistor and capacitor for supplying the lag effect between the amplifier input and output. By means of the lag amplifier, the DC channel provides full frequency compensation. The output is applied to summer 28. The AC or dynamic channel preferably consists of a feedback amplifier 34 having a conventional feedback through a resistor 36 to provide an output proportional to input. Intermediate the input to amplifier 34 and conductor 18 is a high-pass network 32 comprising a resistor and capacitor. The output of amplifier 34 is also supplied through conductor 40 to the summer 28. Thus the AC or dynamic channel is fed through an active rate compensation network 32 to the other input of summer 28. In this manner each signal may be operated upon independently to provide static loop compensation.

The amplifier means 22 is shown in schematic form in FIG. 3. The first stage 50 consists of a "triple block" differential amplifier which utilizes transistors having high betas as high as 50,000. Betas values in this range are for very high input impedance and insure good voltage gain stability of the stage. The second stage 57 consists of transistors 58, 59, in a "feedback" arrangement. Use is made of high beta PNP and NPN transistors. Each transistor has high voltage gain, and negative feedback is applied to the input by resistor 60. The output stage of 61 which includes transistors 62, 63 is complementary symmetry, operated class AB. In the lag means 21 2.01 $\mu$fd. capacitors 64, 65 roll off the gain of the first stage at 3000 c.p.s. Zener diodes 67, 68 are used for signal limiting of the amplifier output. The limiting level at the output attenuator is plus, minus, one volt.

The rate amplifier means 33, shown schematically in FIG. 4, is essentially an active high pass filter. It consists of an operational amplifier 70 with a high pass input network 32 of a series capacitor and resistor to provide a differentiation and lag break at 400 radians per second (63.7 c.p.s.). A differential amplifier 72 is used as the first stage. A single PNP, high beta low leakage transistor 73 is used for the second stage 74, and a complementary symmetry stage 79 for the output. Open loop compensation is provided by capacitors 80, 81, 82, 83, and resistor 84. The output from rate amplifier means 33 is supplied to transmission means 40. Zener feedback limiting by arrangement 36 is used around the amplifier to set limiting level and to control the amplified parameters during the limiting condition.

Limiting by placing Zener diodes in the feedback circuit is used on all amplifiers with the exception of the lag amplifier 21 which provides symmetrical signal limiting and prevents amplifier saturation with its resultant time lags.

FIG. 5 shows the transistor switch 27 and a portion of the lag amplifier means 21 controlled thereby through conductor 26 with the control input via conductor 37 from the rate amplifier 33. The transistor switch consists of two sections, 90, 91. Section 91 consists of two NPN transistors 94, 95 with the collector of transistor 95 connected through conductor 26 to one side of the capacitor in the feedback network 24 of the lag amplifier arrangement 21. With the arrangement as shown, transistor 94 is normally conducting since its base is positive relative to the emitter connected to ground potential. The current through transistor 94 so biases by resistors the base of transistor 95 relative to the emitter connected to signal ground that no current passes through transistor 95 and thus the capacitor in network 24 is not connected to signal ground and may be charged by the feedback signal. However, when there is a high negative rate of change of signal through network 32 of the rate amplifier and thus a large negative pulse on conductor 37 applied to the Zener diode 96, the transistor 94 is cut off whereby the voltage on the base of transistor 95 becomes positive relative to the emitter, and a circuit path is provided through transistor 95 effecting the discharge of the capacitor in network 24 in the lag amplifier arrangement 21.

In a similar manner in section 90 of the transistor switch, when conductor 37 receives a large positive voltage from the rate amplifier 33 due to a high rate of change of the input signal to rate amplifier 22, the current flow through transistor 98 is cut off and the current path through transistor 99 is completed whereby through conductor 26 the condenser in the network 24 in the lag amplifier 21 is connected to signal ground for discharge thereof.

The transistor switch of FIG. 5 is used to disable the DC channel as to the lag effect during periods of large rates of change of the input signal as when it changes phase to thereby improve the loops transient response without decreasing gain and prevents an oscillatory condition from developing at turn on periods. The switch is actuated by the rate amplifier 33, and operates on either plus or minus signal polarities as explained. Specifically the circuit of FIG. 5 operates as follows, whenever signal rates of change are sufficient in magnitude to cause the amplifier to limit (7.5 volts for example), the transistor is actuated and performs two functions: (1) the input of the lag amplifier (DC channel) is clamped to ground, and (2) any charge existing on the capacitor in the feedback network 24 is connected to signal ground for discharge. This grounded condition exists for the period of time that the rate amplifier remains in limiting. Thus when rate conditions reach or exceed a predetermined level in the loop, the AC channel alawys over powers the DC channel and resets the lag capacitance, or time constants of the feedabck circuit 24 of FIG. 2 to approximately zero.

Figure 6:
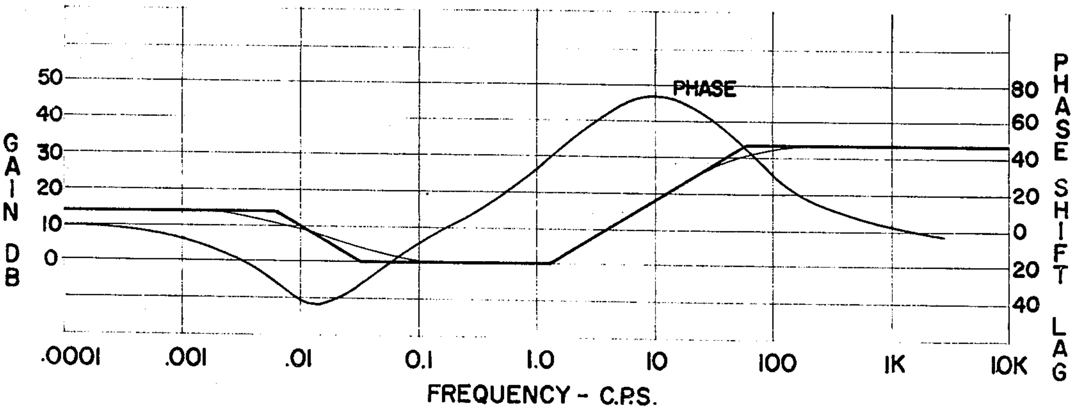
FIG. 6 is a gain-frequency diagram of the lag amplifier, rate amplifier, and summing amplifier response.

The following figures of the drawings pertain to the performance of the novel servo loop and discussion thereof will bring out the advantages of the function of the transistor switch. In FIG. 6 there is shown a graph of the loop static gain-phase characteristics wherein gain is shown as ordinates with the scale on the left-hand side, phase shift is shown as ordinates with the scale on the right-hand side, both plotted against frequency in cycles per second. Thus FIG. 6 gives the overall response of the lag amplifier, rate amplifier and summing amplifier response.

Figure 7:
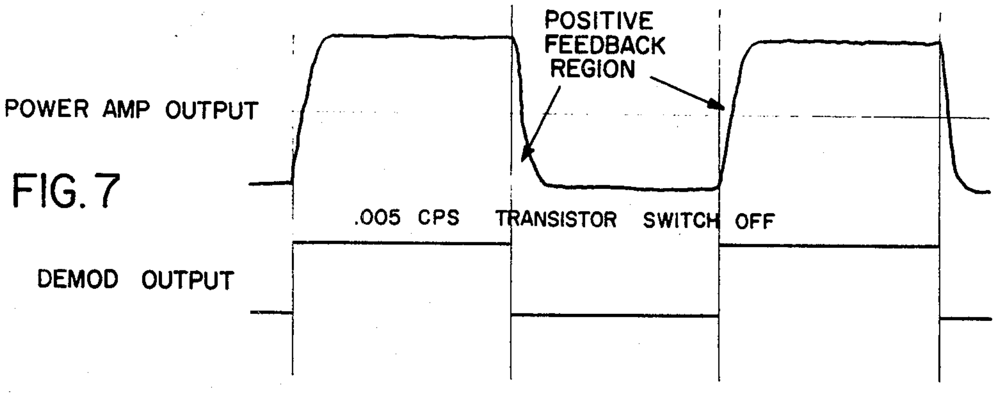
FIG. 7 is a diagram of the single axis platform gimbal control loop transient response for a large signal with the transistor switch disconnected.
Figure 8:
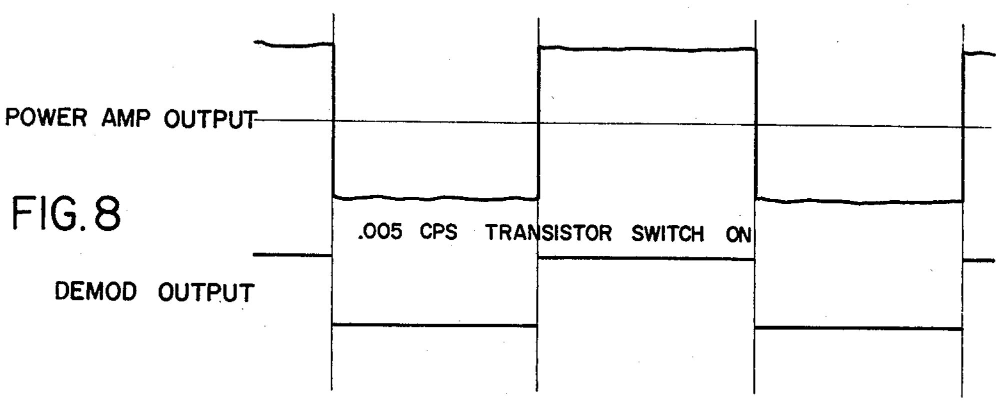

The servo loop's transient response for large step function inputs is shown in FIGS. 7 and 8. FIG. 7 was taken with the transistor switch disconnected and FIG. 8 was taken with the transistor switch on or connected for comparison. The loop response with the switch disconnected as in FIG. 7 should be noted and compared with the demodulator output. At low frequencies such as 0.005 c.p.s., the lag amplifier capacitance becomes fully charged, and the rate amplifier output does not contain sufficient energy to balance or discharge it. The output therefore returns to the polarity appearing on the capacitance before the rate occurred. For a period of time after the rate signal occurs, the output remains in phase with the input until the capacitance charge in the opposite direction. In a closed loop system, this represents a positive feedback or an oscillatory condition.

By comparison in FIG. 8, the output wave forms are shown with the transistor switch connected in the circuitry. Note the improved performance, by observing how closely in phase and without appreciable time lag the power amplifier output corresponds with the demodulator output in FIG. 8 as compared with FIG. 7. In FIG. 7 there is a time lag of the power amplifier output with respect to the demodulator output. Thus this lag in FIG. 7 between the power amplifier output and the demodulator output has the effect of positive feedback on the servo loop.

With reference to FIGS. 9–13, in general, the novel controller for the servomechanism has a linear and a nonlinear mode of operation. The linear mode, wherein the motor torque is proportional to the magnitude of the error, is effective only with small errors. The nonlinear mode, wherein the motor torque is substantially constant for variation in the error signal above a predetermined magnitude, is a result of large errors, such as result from turn-on or a step function input. In the linear mode of operation, aircraft m tion, for example, acts through friction, gimbal mass unbalance and inertia to disturb the stable element. The angular motion of the stable element is sensed by a resolver 12, for example which provides an electrical signal that is amplified and phase compensated to drive the DC torque motor to realign the platform and null the resolver. The output of the demodulator circuit 14 is a voltage having an amplitude proportional to the error angle sensed by the resolver and having polarity indicative of the direction of the error. Angular velocity or rate is obtained indirectly by differentiating the output of the demodulator. Gain and phase compensation are provided by the lag and rate amplifiers 21, 33. Parallel proportional and rate signals are provided power amplifier 43 to insure independent operation with a minimum of interference. The outputs of the lag and rate amplifiers are summed in the summing-power amplifier 43 to provide an output to the torque motor that will drive the servo and resolver to the null position.

Concerning non-linear mode of operation, the term "non-linear" refers to that condition that exists when the output of some device is not proportional to the input. For example, an amplifier has a certain maximum output voltage; any input that would cause the amplifier to exceed this voltage is said to cause the amplifier to be non-linear. Thus the non-linear condition is realized when the error angle of the resolver is comparatively large. That is, the power amplifier 43 is delivering its maximum power to the torque motor and any increase in the error angle of the resolver will not change the output power despite increase in the signal. As stated FIGS. 9–13 show the result of the non-linear operation of the servo.

Figure 13:
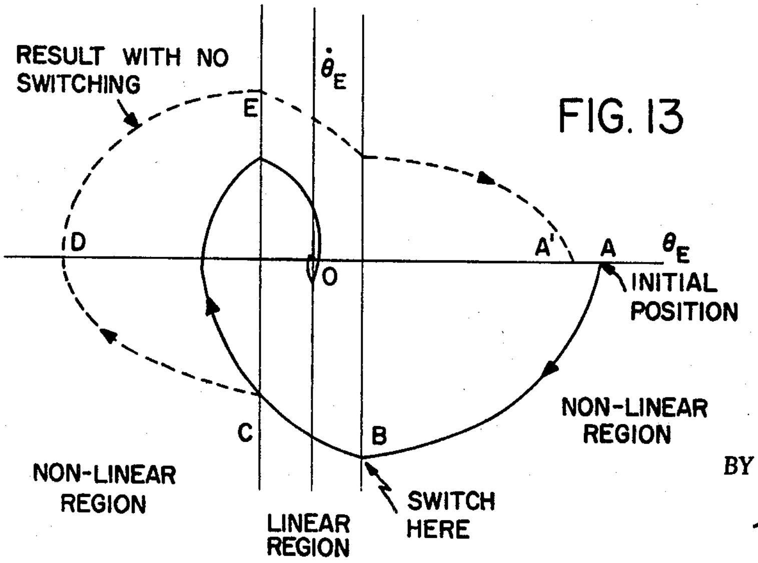

Referring to FIG. 13 it is assumed that the initial displacement from the resolver is O–A. The magnitude O–A is assumed large such that the error signal causes nonlinear operation and thus substantially constant torque is applied by the platform torque motor. This constant torque continues such that the error is reduced but the motor rate increases until point B is attained.

At point B, the error signal is small enough so that the operation of the platform motor would be within the linear region of loop operation for further decreases in the magnitude of the error signal. However, at point B, the velocity of the platform is such that even if rate information were available, the platform velocity and the platform error cannot be reduced to zero simultaneously (a criterion for stability). This phenomenon is a result of the mechanical inertia of the platform and the electrical inertia of the lag network.

At point C, in FIG. 13, the servo is at the end of its linear range of operation and the error signal is of opposite polarity. However, mechanical and electrical inertia carry the platform from C to D in the same direction as the original error signal O–A. At point D, the reverse torque has reduced the platform velocity to zero, but the position error is very large and in the opposite of O–A. Reverse torque continues to be applied which carries the platform from D to E such that the signal error is reduced, but the velocity has increased to a new high with a sense opposite to that at point B. Again the platform passes through the null position, but mechanical and electrical inertia force the platform away from null toward point A'. At point A' a sufficient torque has been applied to stop the platform but the position error is again very large.

Figure 9:
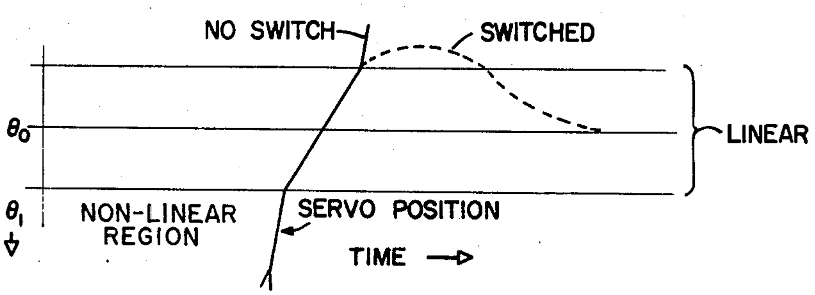
FIG. 9 depicts the magnitudes of error signals of both polarity that will effect linear operation.
Figure 10:
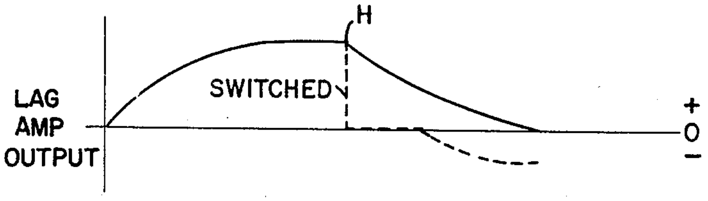
FIG. 10 depicts the normal output of the lag amplifier during the nonlinear and linear range and also the modified output due to switching.
Figure 11:
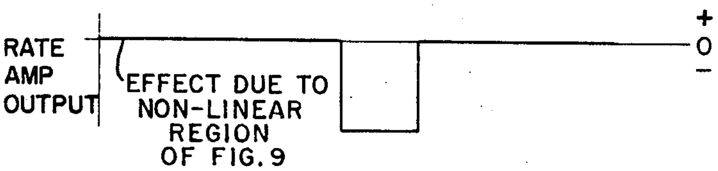
FIG. 11 shows the rate amplifier output for large signals and for small signals.
Figure 12:
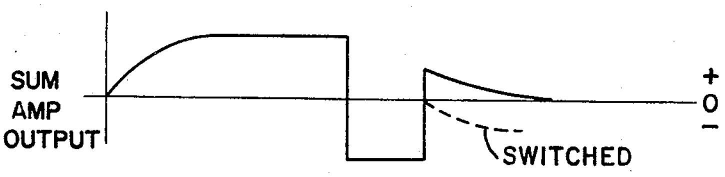
FIG. 12 depicts the effects due to switching of the summing amplifier output.

A servo that may be described by such a trajectory is said to be in oscillation and it will continue in this mode until friction or losses or external forces act upon it to cause the velocity and position error to go to zero simultaneously. Reference may now be made to FIGS. 10, 11, and 12 showing the effect of switching. From FIG. 9 we note that the initial error signal corresponding to the angle of the resolver is beyond the linear range. In FIG. 10, the lag amplifier output ultimately reaches a maximum magnitude. In FIG. 11, since the magnitude of the error signal is beyond the linear range, there is no change in the rate amplifier output for the initial portion of the graph. At point H in FIG. 10, which corresponds to the beginning of the linear operation, the lag amplifier output begins to change or decrease. There is also a change in the output of the rate amplifier. Since we are now in the proportional or linear range, the rate amplifier output after changing as stated remains constant since the rate as evident from FIG. 9 is constant due to the linear operation.

In FIG. 10, due to the novel switching action, the input of the lag amplifier is clamped to ground and any charge existing on the large capacitor is discharged. This effect or loss of charge is represented by the dotted line in FIG. 10. We can now see this effect in the operation on the torque motor that drives the gyro platform. The torque motor is controlled by the outputs of both the lag amplifier and the rate amplifier. With the lag amplifier switched as stated, the electrical inertia is dumped from the system and the sole control of the motor is by the rate amplifier until the proportional and velocity errors have been sufficiently reduced in magnitude such that the system is operating within the linear region. Consequently, when the motor operation is at B in FIG. 13, and before the displacement error had been reduced to zero, because of the switching action the energization of the torque motor is applied in the opposite direction and does not wait until the position error is reduced to zero. Hence due to this switching action of the rate amplifier, the operation of the motor follows the solid line in FIG. 13 thereby tending to reduce overshoot of the resolver null position by the motor and thereby increasing the stability of the servomechanism or closed loop system.

It will now be evident that there has been provided herein an improved servo loop utilizing two parallel loops in the signal path wherein the rate loop speeds up system response and impedes overshoot in the loop for large inputs, with the lag feedback providing lag compensation needed for loop stability at low magnitude inputs. It should be noted that the apparatus embodying the present invention is general in nature and is not limited to stabilization of a servomechanism for a single axis gyro. Stabilization may be made to other servo loops.

Having thus described the invention, what is claimed is:

1. In a closed loop servo system: a source of position error signal; only two parallel channels each forming a signal path receiving a similar variable electrical error input signal from said source, one channel being a lead channel responsive to rate of change of said error signal for speeding up the operation of the closed lop servo system, the other a lag channel including a capacitor providing lag compensation and input data smoothing to the system, and means responsive to rate of change of the signal connected to the capacitor in the lag channel for disabling the lag effect in the lag channel for high rate of change of said variable input signal.

2. In a closed loop system having parallel branches both receiving substantially the same input signal variable in magnitude, one branch comprising a lead channel responsive to rates of change in the magnitude of the input signal for speeding up the operation of the loop, the other a lag channel providing lag compensation, and on-off nonlinear means in the lead channel connected to the lag channel for altering the gain of the lag channel as the rate of change of input signal attains a high rate of change.

3. In a closed loop servo system comprising an amplifier and motor and a source of displacement electrical signal, a limiter receiving said signal, a lag channel receiving an input signal from the limiter, said channel including a resistor-capacitor combination, providing lag compensation and input signal data smoothing to said system, a rate channel, the rate channel receiving the same signal from the signal limiter as applied to the lag channel, said rate channel including differentiating means for said signal, and said means controlled by the rate channel and connected to the lag channel and effective on a high rate of change of said input signal, only when the displacement signal is below the limit, transmitted by the differentiating means disabling the lag effect of the resistor-capacitor combination in the lag channel.

4. In a closed loop servo system having means for supplying a control signal variable in phase: a lead channel responsive to the rate of change of said signal for speeding up the operation of the servo loop; a lag channel having signal capacitor means therein receiving said signal providing lag compensation and input data smoothing in said servo loop; and means in the lead channel differentiating said signal and connected to the capacitor means disabling the lag effect of the lag channel at high rates of change of said signal as when it changes from one phase to another to avoid positive feedback from the lag channel to the servo loop.

5. In a closed loop servo-condition control system comprising input means responsive to an applied variable phase displacement signal controlling a power amplifier and servomotor for reducing or nulling said displacement signal, said input means comprising, a source of displacement error signal, a lead channel having a differentiating network responsive to rate of change of said applied signal for speeding up the operation of the servo loop, a lag channel comprising a resistor and capacitor charged by the signal providing lag compensation in the servo loop for said applied signal; and means responsive to high rates of change of said applied signal as when the displacement signal changes phase and the capacitor would charge in the opposite direction, effective to discharge the capacitor in the lag channel to prevent positive feedback effect to the system and resulting in overshoot thereof and controlling the system solely through the lead channel.

References Cited

UNITED STATES PATENTS

| | | |
|---|---|---|
| 2,668,264 | 2/1954 | Williams. |
| 3,219,936 | 11/1965 | Eksten et al. |
| 2,439,198 | 4/1948 | Bedford. |
| 2,767,361 | 10/1956 | Blomgrist et al. |

THOMAS E. LYNCH, Primary Examiner

U.S. Cl. X.R.

244—77; 318—28, 489